United States Patent [19]

Vink et al.

[11] Patent Number: 4,753,816

[45] Date of Patent: Jun. 28, 1988

[54] FRUIT JUICE BASED HARD CANDY

[75] Inventors: Walter V. W. Vink, Boonton, N.J.; Andrew T. Lombardo, Bronx, N.Y.

[73] Assignee: Nabisco Brands, Inc., Parsippany, N.J.

[21] Appl. No.: 52,663

[22] Filed: May 20, 1987

[51] Int. Cl.$^4$ ............................................. A23G 3/00
[52] U.S. Cl. ................................... 426/660; 426/599; 426/330.5
[58] Field of Search ............ 426/660, 658, 599, 330.5

[56] References Cited

U.S. PATENT DOCUMENTS

| | | | |
|---|---|---|---|
| 1,204,880 | 11/1916 | Kern | 426/599 |
| 2,227,813 | 1/1941 | Roland | 426/660 |
| 2,594,538 | 4/1952 | Brabaek | 426/660 |
| 2,834,681 | 5/1958 | Kreager | 426/660 |
| 3,332,783 | 7/1967 | Frey | 426/660 |
| 3,554,766 | 1/1971 | Engel | 426/640 |
| 3,677,770 | 7/1972 | Witzel | 426/660 |
| 3,953,615 | 4/1976 | Gupta et al. | 426/599 X |
| 4,117,172 | 9/1978 | Bradshaw et al. | 426/577 |
| 4,117,176 | 9/1978 | Taylor et al. | 426/660 |
| 4,205,093 | 5/1980 | Blake | 426/660 |
| 4,311,722 | 1/1982 | Vink | 426/660 |
| 4,327,115 | 4/1982 | Kime | 426/599 X |
| 4,355,050 | 10/1982 | Butland | 426/660 |
| 4,362,757 | 12/1982 | Chen et al. | 426/559 |
| 4,542,033 | 9/1985 | Agarwala | 426/321 |

*Primary Examiner*—Jeanette Hunter
*Attorney, Agent, or Firm*—Richard Kornutik

[57] ABSTRACT

Shelf stable hard candy glass is made with a relatively high concentration of natural fruit juice and fruit juice solids.

6 Claims, No Drawings

FRUIT JUICE BASED HARD CANDY

FIELD OF THE INVENTION

The present invention relates to shelf stable hard candy having a relatively high concentration of natural fruit juice and fruit juice solids.

DESCRIPTION OF THE PRIOR ART

U.S. Pat. No. 4,311,722 discloses the preparation of hard candy from fructose. The candy compositions of this patent also require the presence of materials such as dextrin. The patent also indicates that small amounts of fruit flavor oils may be used to impart a fruit flavor to the candy.

U.S. Pat. No. 2,594,538 discloses the preparation of carmelized candy made, in part, from sugar and fruit juice, which is subjected to sugar inverting conditions, and provides a product having a jelly to taffy-like consistency.

U.S. Pat. No. 4,205,093 discloses an elastic, solid, snack food product prepared from citrus juice vesicle solids, carbohydrate sweetening agents, acidulents and about 8–30% water. These products have a moisture activity of about 0.30 to 0.85.

U.S. Pat. No. 4,232,053 discloses cooked comestible bases prepared from citrus juice vesicles, carbohydrate sweetening agents, acidulents, ungelatinized starch and added water. The products are apparently relatively highly viscous materials having a moisture content of about 30 to 60%.

U.S. Pat. No. 4,362,757 discloses the preparation of a powdered co-crystallized sugar product by cooking a mixture of an active ingredient, which is an acidic, high invert sugar substance such as fruit juice, with a dry sugar base.

Prior to the present invention, however, the art has not provided a shelf stable hard candy made with relatively large amounts of fruit juice so as to provide a hard candy product with a large content of natural fruit juice and fruit juice solids.

An object of the present invention, therefore, is to provide a shelf stable hard candy which is made with a relatively high percent of natural fruit juice and fruit juice solids.

SUMMARY OF THE PRESENT INVENTION

It has now been found that shelf stable hard candy can be prepared with large concentrations of natural fruit juice and fruit juice solids if the formulations and procedures outlined below are followed.

DESCRIPTION OF THE PREFERRED EMBODIMENT

The term hard candy as used herein means a hard, sugar glass, amorphous candy product prepared by evaporation of water from a sugar solution so as to concentrate to a solids content of not less than 95% by weight.

The term shelf stable hard candy, as used herein, means a hard candy which, when stored unpackaged for four (4) weeks at 25° to 40° C. and at 20 to 40 percent relative humidity, absorbs only about 3 to 5% by weight moisture.

The term fruit, as used herein, means any and all fleshy fruits which are the ripened ovaries of flowers, with or without other associated parts (Foods and Food Production Encyclopedia, D. M. Considine Editor, 1982, pages 775–780).

These fruits would thus include the fruit of deciduous trees, such as, apple, apricot, cherry, peach, pear, plum, nectarine and persimmon;

citrus fruits such as orange, lemon, lime, grapefruit (tangelo), mandarin (tangerine), pummelo, citron (citrus paradise), papeda, tachibana and kumquat;

bushberry fruits such as blackberry, raspberry, dewberry, strawberry, blueberry, bilberry, cranberry, huckleberry, eldeberry, currant and gooseberry;

other berry fruits such as tomato, grape, banana (including plantain) and avocado;

multiple fruits such as pineapple, mulberry, fig and breadfruit; and gourd fruits such as watermelon, muskmelon, cantelope, cucumber, squash, pumpkin and citron (*citrullus vulgaris*).

The term fruit, as used herein, does not include dry fruits such as legumes, follicles, capsules, achene, caryopsis or grain, samara and nuts, nor seeds such as coconut and kola nut.

The hard candy products of the present invention, in final form, have a fruit juice solids content of about 5 to 25% by weight. By fruit juice solids it is meant fiber, pulp, sugar and other plant matter which is naturally and normally present in pureed fruit or fruit juice prepared for human consumption.

The hard candy products of the present invention may be prepared from the juice of individual fruits or from mixtures of two or more of the fruits.

The fruit juice that is used as the basic raw material in preparing the products of the present invention is preferably used in the form of an unclarified fruit juice concentrate which contains the juice of one or more fruits, and has a fruit juice solids content of about 15 to 80, and preferably of about 50 to 75, weight %. Where the naturally occurring fruit juice, as freshly obtained from the fruit, has a solids content of less than about 15% by weight, the solids content of the juice can be concentrated by removing some of the water content of the juice by commonly employed techniques for forming fruit juice concentrates or by adding a high fruit solids content material thereto, such as a pureed fruit.

Where the naturally occurring fruit has a relatively high solids content, such as in the case of banana, fig, cantelope, avocado, breadfruit, pumpkin and the like, the fruit may be pureed and then diluted with water or a low solids content juice of another fruit to provide a fruit juice concentrate having the desired solids content for the purposes of the present invention.

The hard candy is made by forming an aqueous reducing syrup containing about 20 to 80, and preferably about 40 to 60, weight %, on a dry basis, of a sugar component and about 80 to 20, and preferably about 60 to 40, weight % fruit juice solids.

The sugar component of the reducing syrup may be any bulk sugar material normally used in the manufacture of confectionery products such as a carbohydrate such as sucrose, dextrose, fructose, corn syrup solids, lactose, maltose, galactose and mannose, or a sugar alcohol such as sorbitol, mannitol, xylitol, isomaltol, hydrogenated starch hydrolysates, and lactose hydrolysate syrups.

These bulk sugar materials are water soluble, i.e., they are soluble in water at 20° C., to the extent of at least 10% by weight. The bulk sugar materials may be used individually or in various combinations thereof.

The reducing syrup is then buffered with a buffering agent system formed from food grade acids such as citric acid, malic acid, maleic acid, phosphoric acid and salts thereof such as the sodium and potassium salts such as trisodium phosphate.

The buffering is conducted so as to provide that the fruit juice when cooked to the hard candy state, as noted below, will be maintained at a pH of 4 to 8, and preferably 5.2 to 6.0.

After the concentrated syrup is buffered it is then admixed with the remainder of the candy base to provide a hard candy base formula comprising about 75 to 95, and preferably about 82 to 92, weight % of the sugar component on a dry basis, and about 5 to 25, and preferably about 8 to 18, fruit juice solids.

This final candy base solution is then cooked at about 130° C. to 160° C., at atmospheric pressure, with the application of a vacuum of about 76 to 760 mm of Hg being applied to the cooked system during the last few minutes of the evaporation process, to drive off excess water and provide the desired hard candy product. On a batch basis, this cooking time will take about 5 to 60 minutes depending on the temperature employed, the size of the batch, and the amount of water to be removed. Even though the candy base solution is cooked at relatively high temperatures the components thereof will not undergo any type of degradation in the form of sugar inversion. The presence of protein may cause some discoloration under extreme conditions of time and temperature.

The resulting hard candy product has, on a dry weight basis a moisture content of about 0.1 to 5, and preferably of about 1 to 2, weight %, a fruit solids content of about 5 to 25, and preferably of about 8 to 18, weight % an added sugar component content of about 70.0 to 94.9, and preferably of about 80 to 91 weight %.

In addition to the fruit juice solids, sugar component and buffering agent the hard candy products of the present invention may also be made from, and/or contain, small amounts of one or more of the following components,

| Component | Amount of Component (Weight %) |
|---|---|
| Colorant | 0 to 2 |
| Flavorant | 0 to 3 |

The colorants used in this regard are conventional FD&C and natural coloring agents used in confectionery products.

The flavorant which can be included in the hard candy products made according to this invention can comprise one or more natural and/or synthetic flavors and/or oils derived from plants, leaves, flowers and fruit. Representative flavors and oils of these types includes acids such as adipic, succinic and fumaric acid; citrus oils such as lemon oil, orange oil, lime oil and grapefruit oils; fruit essences, such as apple essence, pear essence, peach essence, strawberry essence, apricot essence, raspberry essence, cherry essence, plum essence, and pineapple essence; essential oils such as peppermint oil, spearmint oil, mixtures of peppermint oil and spearmint oil, clove oil, bay oil, anise oil, oil of nutmeg, oil of sage, oil of bitter almonds, cassia oil and methylsalicylate (oil of wintergreen). Various synthetic flavors, such as those for a mixed fruit, may also be incorporated in the hard candy products of the present invention, with or without convention preservatives.

The flavors may be used individually or in various combinations thereof.

The following example is merely illustrative of the present invention and is not intended as a limitation upon the scope thereof.

EXAMPLE

A 70° Brix pineapple juice based reducing syrup was obtained by admixing about 1800 lbs of 72° Brix pineapple juice concentrate with about 2800 lbs of a 44° Be' 42 DE corn syrup and about 570 lbs. of water. The pineapple juice concentrate contained about 72% fruit juice solids. This reducing sugar syrup was then buffered to a pH of about 5.2±0.2 with one normal NaOH (in combination with the naturally occurring citric acid in the juice).

The buffered solution (64 pounds) was then admixed with 172 lbs of liquid sucrose (having a 67% solid content) and cooked at about 270° F. over a period of about 15 minutes at atmospheric pressure. The cooked product is then worked up, using conventional hard candy processing techniques, to provide solid, hard candy glass pieces measuring about 0.8"×0.8"×0.26". When subjected to storage stability tests, the product demonstrated a stability equal to conventional hard candy containing 80% sugar in terms of hydroscopicity and grain.

Other desireable attributes of these candies were textural properties contributed by the fruit pulp and a natural-like flavor contributed by the juice concentrate.

The candy contained on a dry weight basis, about 1.5% moisture, about 10% pineapple solids or about 50% (as reconstituted) pineapple juice.

As compared to what might be expected based on attempts to manufacture hard candy under comparable conditions by cooking sucrose based candy base solutions, the candy making process of the present invention provides unexpected results. When such sucrose based candy base solutions are cooked at high temperatures of 130°–160° C. and contain a level of neutralized acid equivalent to the fruit juice concentrate, and at pHs of about 5, the percent of sugar inversion that occurs is about 5% or more which leads to the production of off-colored products or undesired levels of hydroscopictiy. The off-color results from Maillard reaction products. These sugar/acid systems are readily encountered in processing reworked sugar based candy. When the products of the present invention are prepared, by cooking the high fruit juice content syrups at 130°–160° C. and at a pH of about 5, very little, if any, off-color products arise due to Maillard reactions, and no untoward level of sugar inversion occurs. The % sugar inversion obtained in the process of the present invention is about 1 to 2%, at most.

What is claimed is:

1. A shelf stable hard candy glass containing natural fruit juice and fruit juice solids and having, on a dry weight basis, a moisture content of about 0.1 to 5%, a fruit solids contents of about 5 to 25%, and an added sugar component content of about 70.0 to 94.9%.

2. A hard candy as in claim 1 in which said fruit comprises pineapple.

3. A hard candy as in claim 2 which has a moisture content of about 1 to 2%, a fruit solids content of about 8 to 18% and a sugar component content of about 80 to 91%.

4. A hard candy as in claim 1 prepared essentially from fruit juice, fruit juice solids, sugar component and acidic buffering agent.

5. A process for making a shelf stable hard candy which comprises forming a reducing syrup from sugar component fruit juice and fruit juice solids, said syrup containing about 20 to 80 weight % fruit juice solids, and about 20 to 80 weight % sugar component, buffering said reducing syrup to a pH of about 4 to 8, admixing the buffered syrup with additional sugar component to provide a hard candy base formula containing about 5 to 25 fruit juice solids, and about 25 to 95% sugar component, and cooking said base formula so as to provide said hard candy.

6. A process as in claim 5 in which the fruit comprises pineapple.

* * * * *